(12) United States Patent
Meza et al.

(10) Patent No.: US 6,620,359 B1
(45) Date of Patent: Sep. 16, 2003

(54) WATER BASED METHOD OF MAKING EXPANDED GRAPHITE THE PRODUCT PRODUCED AND EXPANDED GRAPHITE POLYMERIC PELLETS

(75) Inventors: David M. Meza, Canyon Country, CA (US); Brian H. Green, Santa Clarita, CA (US); Takashi Sarumaru, Granada Hills, CA (US)

(73) Assignee: SGL Technic, Inc., Valencia, CA (US)

( * ) Notice: Subject to any disclaimer, the term of this patent is extended or adjusted under 35 U.S.C. 154(b) by 207 days.

(21) Appl. No.: 09/833,389

(22) Filed: Apr. 11, 2001

(51) Int. Cl.⁷ .............. B29B 9/10; B29B 13/00; C08K 3/04
(52) U.S. Cl. .......... 264/115; 264/118; 423/448; 423/460; 524/496
(58) Field of Search .............. 264/109–128; 423/448, 460; 524/496

(56) References Cited

U.S. PATENT DOCUMENTS

| | | |
|---|---|---|
| 1,137,373 A | 4/1915 | Aylsworth |
| 1,171,090 A | 2/1916 | Cook |
| 1,325,950 A | 12/1919 | McClure |
| 1,695,682 A | 12/1928 | Creamer |
| 1,897,088 A | 2/1933 | Victor |
| 1,904,651 A | 4/1933 | Victor |
| 1,911,484 A | 5/1933 | Victor |
| 1,927,450 A | 9/1933 | Balfe |
| 1,968,365 A | 7/1934 | Bailey |
| 1,997,987 A | 4/1935 | Victor, Jr. |
| 2,006,381 A | 7/1935 | Bailey |
| 2,029,302 A | 2/1936 | Balfe |
| 2,056,854 A | 10/1936 | Hene |
| 2,211,045 A | 8/1940 | Balfe |
| 2,930,106 A | 3/1960 | Wrotnowski |
| 2,992,151 A | 7/1961 | Niessen |
| 3,061,656 A | 10/1962 | Chappell |
| 3,333,941 A | 8/1967 | Olstowski et al. |
| 3,341,211 A | 9/1967 | Houghton et al. |
| 3,389,964 A | 6/1968 | Olstowski et al. |
| 3,403,595 A | 10/1968 | Watson |
| 3,404,061 A | 10/1968 | Shane et al. |
| 3,414,381 A | 12/1968 | Olstowski et al. |
| 3,423,496 A | 1/1969 | Olstowski et al. |
| 3,431,970 A | 3/1969 | Olstowski et al. |
| 3,494,382 A | 2/1970 | Shane et al. |
| 3,560,155 A | 2/1971 | Olstowski et al. |
| 3,718,720 A | 2/1973 | Lambdin, Jr. et al. |
| 3,885,007 A | 5/1975 | Olsen et al. |
| 3,970,322 A | 7/1976 | Stecher et al. |
| 4,042,747 A | 8/1977 | Breton et al. |
| 4,068,853 A | 1/1978 | Schnitzler |
| 4,075,114 A | 2/1978 | Ishikawa et al. |
| 4,146,401 A | 3/1979 | Yamada et al. |
| 4,234,638 A | 11/1980 | Yamazoe et al. |
| 4,391,787 A | 7/1983 | Tibbetts |
| 4,491,569 A | 1/1985 | Tibbetts |
| 4,497,788 A | 2/1985 | Bradley et al. |
| 4,565,649 A | 1/1986 | Vogel |

(List continued on next page.)

FOREIGN PATENT DOCUMENTS

| | | |
|---|---|---|
| JP | 49099986 A | 9/1974 |
| JP | 63098964 A | 4/1988 |

*Primary Examiner*—Stephen J. Lechert, Jr.
(74) *Attorney, Agent, or Firm*—Blakely Sokoloff Taylor & Zafman, LLP

(57) ABSTRACT

A method of making expanded graphite. The method comprises grinding flexible graphite foil, preferably recycled material, to a small particle size, wetting the graphite foil with a water solution, thermally shocking the particles to expand them, mixing the expanded graphite with a thermoset phenolic resin, heating the mixture under pressure to form a solid sheet and then heat treating the solid sheet.

13 Claims, 3 Drawing Sheets

U.S. PATENT DOCUMENTS

| | | |
|---|---|---|
| 4,565,684 A | 1/1986 | Tibbetts et al. |
| 4,591,170 A | 5/1986 | Nakamura et al. |
| 4,705,722 A | 11/1987 | Ueda et al. |
| 4,748,075 A | 5/1988 | Beyer et al. |
| 4,749,557 A | 6/1988 | Yetter et al. |
| 4,752,518 A | 6/1988 | Lohrke et al. |
| 4,776,602 A | 10/1988 | Gallo |
| 4,822,062 A | 4/1989 | Gallo et al. |
| 4,852,893 A | 8/1989 | Wesley |
| 4,895,713 A | 1/1990 | Greinke et al. |
| 4,908,169 A | 3/1990 | Galic et al. |
| 5,024,818 A | 6/1991 | Tibbetts et al. |
| 5,130,199 A | 7/1992 | Howard |
| 5,134,030 A | 7/1992 | Ueda et al. |
| 5,172,920 A | 12/1992 | Schlenk |
| 5,225,262 A | 7/1993 | Leduc |
| 5,370,405 A | 12/1994 | Ueda |
| 5,374,415 A | 12/1994 | Alig et al. |
| 5,382,384 A | 1/1995 | Baigrie et al. |
| 5,389,400 A | 2/1995 | Ting et al. |
| 5,395,126 A | 3/1995 | Tresslar |
| 5,413,773 A | 5/1995 | Tibbetts et al. |
| 5,433,906 A | 7/1995 | Dasch et al. |
| 5,482,798 A | 1/1996 | Mototani et al. |
| 5,499,826 A | 3/1996 | Pippert et al. |
| 5,582,781 A * | 12/1996 | Hayward .................... 264/28 |
| 6,217,800 B1 * | 4/2001 | Hayward .................... 264/109 |

* cited by examiner

WATER BASED METHOD OF MAKING EXPANDED GRAPHITE THE PRODUCT PRODUCED AND EXPANDED GRAPHITE POLYMERIC PELLETS

BACKGROUND

1. Field of the Invention

Expanded graphite material.

2. Art Background

In the prior art, various forms of graphite material have been used to give charge carrying or dissipating capacity to polymers. Graphite material has been used to enable polymer material to conduct or dissipate electrostatic charge and the like.

One of the first such graphite insulating materials was powdered carbon black which had an appropriate amount of electrical conducting capacity, but was very difficult to handle, relatively heavy, and extremely time consuming to replace. As a result of the advent of polymer chemistry, a number of newer materials were developed which are lighter and easier to handle, but which have the requisite electrical current carrying capacity. One such material is a carbon fiber insulating material made of a carbon fiber held in a matrix by a polymer material, and formed into a board, block or other object.

U.S. Pat. No. 5,582,781 discloses, inter alia, a method of making graphite foam material. Expanded graphite is made from flexible graphite foil. The expanded graphite is then compounded into sheets to make a thermally insulative material.

U.S. Pat. No. 5,882,570 discloses, inter alia, a method of injection molding graphite and a thermoplastic material. This method also uses 45 to 60 percent by weight expanded graphite. The compound of thermoplastic material and re-expanded graphite is fed into a molding system (e.g. an injection molding system) at relatively high temperature and injected into a mold where a plastic material is formed. The material is valuable for its heat insulative capacity for use in for example, furnaces and other apparatus.

As the above paragraphs indicate, there is a market for commercialization of graphite-based articles. Thus, improved techniques of forming graphite materials, particularly expanded graphite materials, are desired.

DETAILED DESCRIPTION

A method of making expanded graphite, articles of expanded graphite, and a method of making articles of expanded graphite is disclosed. Such articles include but are not limited to gaskets and thermally insulative materials. Such articles also include articles that are capable of conducting electrical current such as conductive polymers.

Figure 1:
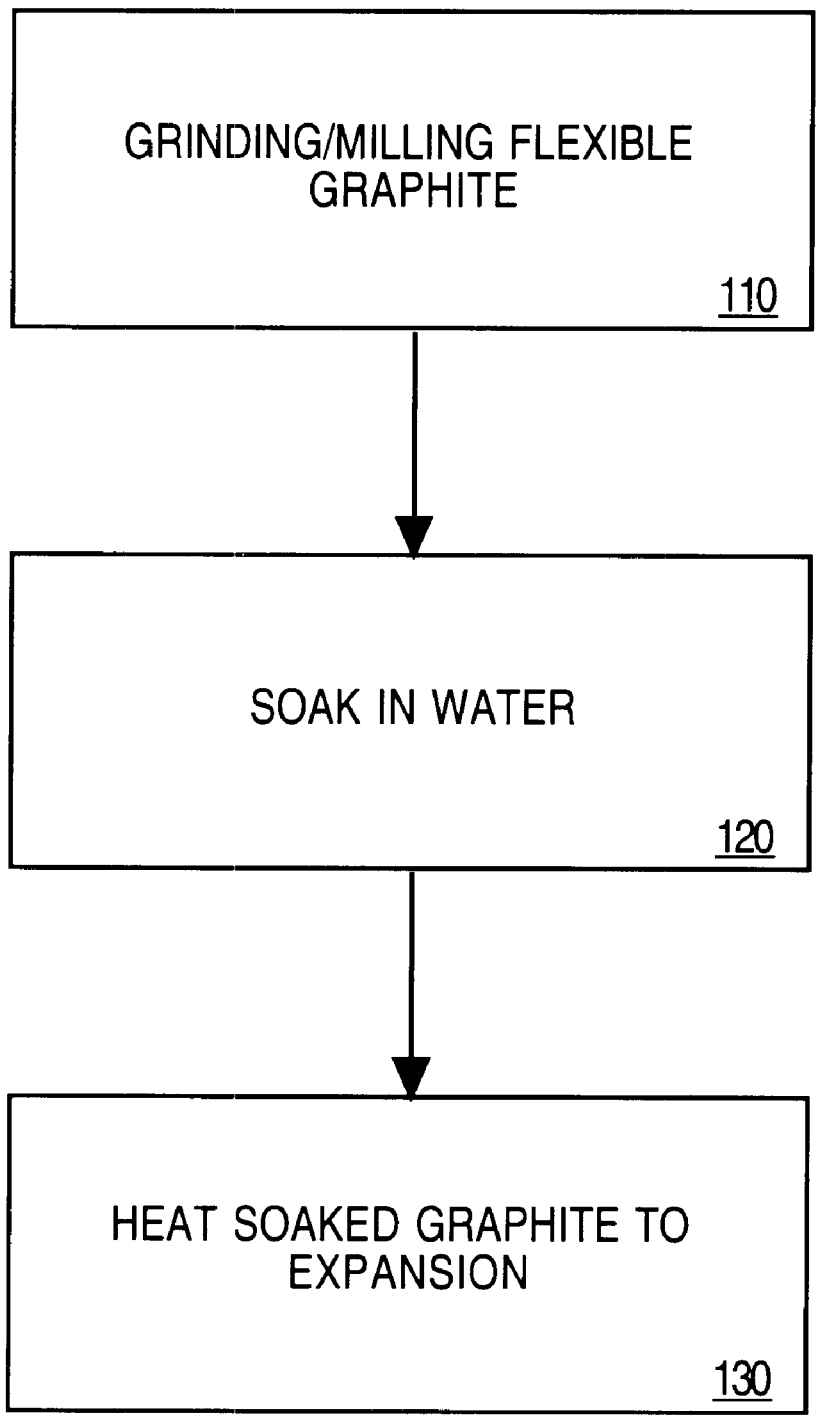
FIG. 1 is a flow chart showing a method of making expanded graphite.

A method of making expanded graphite suitable for use in articles according to one embodiment is shown in the flow chart in FIG. 1. In one embodiment the starting material is flexible graphite. Flexible graphite material is sometimes referred to as vermiculated graphite. Flexible graphite is a graphite material that has been subjected to an expansion and a compaction process. The expansion process typically involves an acid treatment of graphite followed by a heat shock treatment.

One starting material is recycled flexible graphite, such as the type which may be obtained as a byproduct from the manufacture of flexible graphite rolls. The starting material can be in the form of chunks, bricks, strips, or any other form that may be obtained.

Referring to block 110 of FIG. 1, the flexible graphite is ground/milled to a very fine powder having a particle size in the range of 25 to 80 mesh and a tap density of approximately 0.177–0.230 grams per cubic centimeter (g/cc). Somewhat smaller or larger mesh can be used as well. In one embodiment, the grinding/milling process for making the flexible graphite into a powder is as described below.

Virgin or recycled flexible graphite in sheets of, for example, approximately one foot on a side are placed into a shredder. A suitable shredder is, for example, a ST-25EL, commercially available from SHRED-TECH of Ontario, Canada. This shredder has a series of gears and teeth that reduce the graphite sheets to asize of about one inch square.

Once through the shredder, the graphite is put into a rotary grinder. A suitable rotary grinder is, for example, a CU 1012, manufactured by Sprout Bauer of Pennsylvania, USA. This rotary grinder has a cylinder lying on its side. Inside the cylinder is a tri-vaned impeller or rotor. The rotor moves the graphite pieces along the wall of the cylinder where they come in contact with knives set in the sides of the cylinder. The combination of the vanes and the knives cut the graphite into pieces of about ¼ to ⅛ inch. A screen at the bottom of the cylinder retains the graphite within the cylinder while the pieces are greater than ¼ inch in size. Once the pieces are cut down to less than ¼ inch, they pass through the screen and out of the rotary grinder.

After the graphite pieces leave the rotary grinder, they are sent to a pin mill. A suitable pin mill is, for example, a KEK Universal Mill, commercially available from Kemutec of Pennsylvania, USA. This pin mill includes a drum containing a set of rotating pins arranged along the circumference of a circle with a smaller diameter than that of the drum. The position and size of the pins along with their rotation speed break the graphite into particles in the size range of 300 to 1000 microns.

After grinding/milling in FIG. 1, the graphite particles are combined with water. Referring to block 120, the graphite particles are permitted to absorb sufficient water so that they become thoroughly wetted. The graphite is thoroughly wetted when water is in contact with all of the lamella of the graphite. It is the expansion of this water, as it enters the vapor phase, that causes the graphite to expand. In one embodiment, the water may contain a surfactant. It is believed that the surfactant better allows the water to interact with and wet the lamella of graphite. A suitable surfactant includes, but is not limited to, TOMADOL™ 16-91/6 commercially available from Tomah Products, Inc. of Milton, Wis.

In one embodiment, approximately 10 ml of surfactant is combined with about 25 gallons of water. This water solution is typically combined in a continuous process with graphite particles at a ratio of about 2000 milliliters (ml) of water solution with about 25 pounds (about 11 kilograms) of graphite per hour.

Referring to block 130 in FIG. 1, the soaked graphite particles are heated above a temperature sufficient to cause a thermal expansion. In one embodiment, the temperature is above 200° C. and preferably above 500° C. The temperature is more preferably still between 800° C. and 1100° C.

Figure 2:
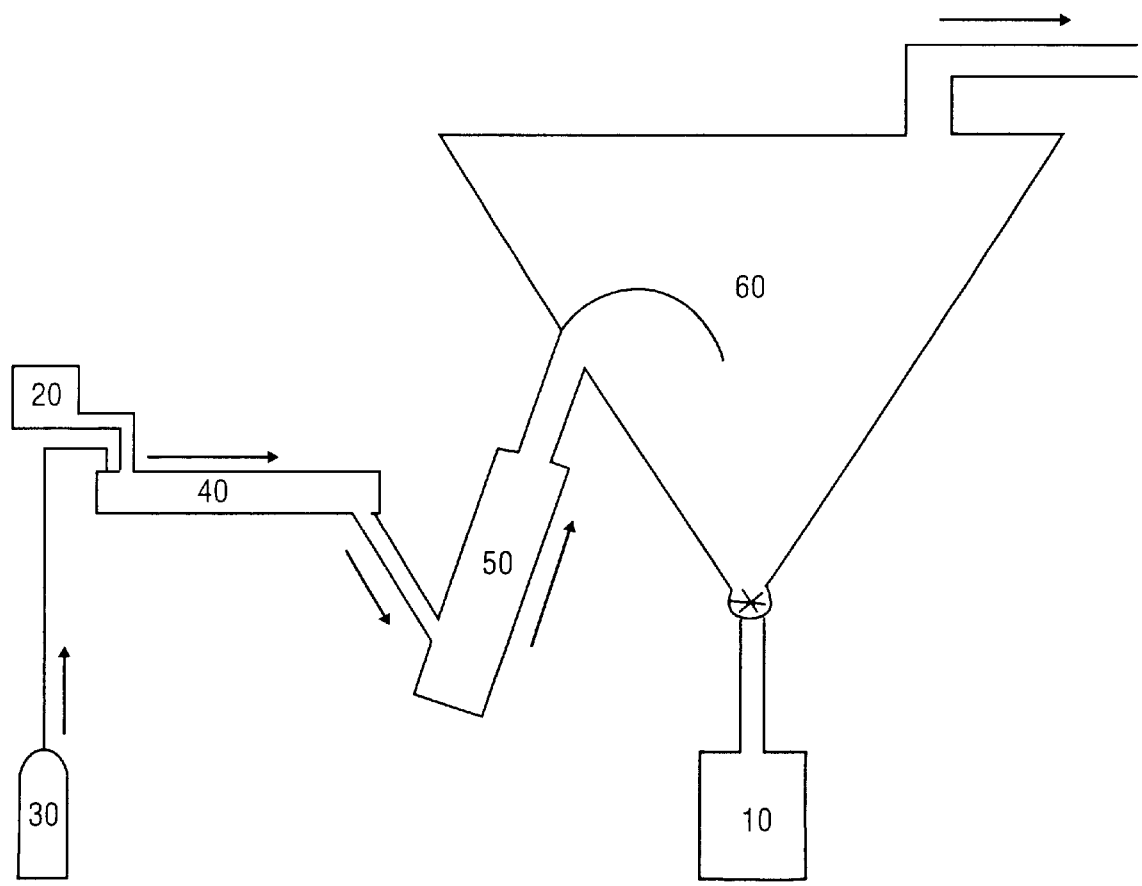
FIG. 2 is an illustration of the process of wetting the graphite.

FIG. 2 illustrates one embodiment of a wetting process using water to wet the graphite particles before re-expansion. Feeder 20 collects the grind/milled flexible graphite. The graphite particles are metered through feeder 20 to mixing blender 40, such as a high speed continuous blender commercially available from Scott Equipment of Minnesota, USA. Simultaneously water, from pressurized water supply 30, that may contain a surfactant, is metered into continuous mixing blender 40. Mixing blender 40 then feeds the mix of wetted graphite powder and water into 540,000 British Thermal Unit (BTU) gas fired tube furnace 50 with an operating temperature above 500° C., and preferably between 800° C. and 1100° C. Graphite typically expands at these temperatures 100–150 times. At the point of entry to the tube furnace, the graphite expands by way of thermal shock making the particles extremely light allowing the particles to become air borne and lifted into accumulation hopper 60. From accumulation hopper 60, the expanded graphite is available for use in forming articles such as gasket materials, insulation material, and conductive polymers.

Figure 3:
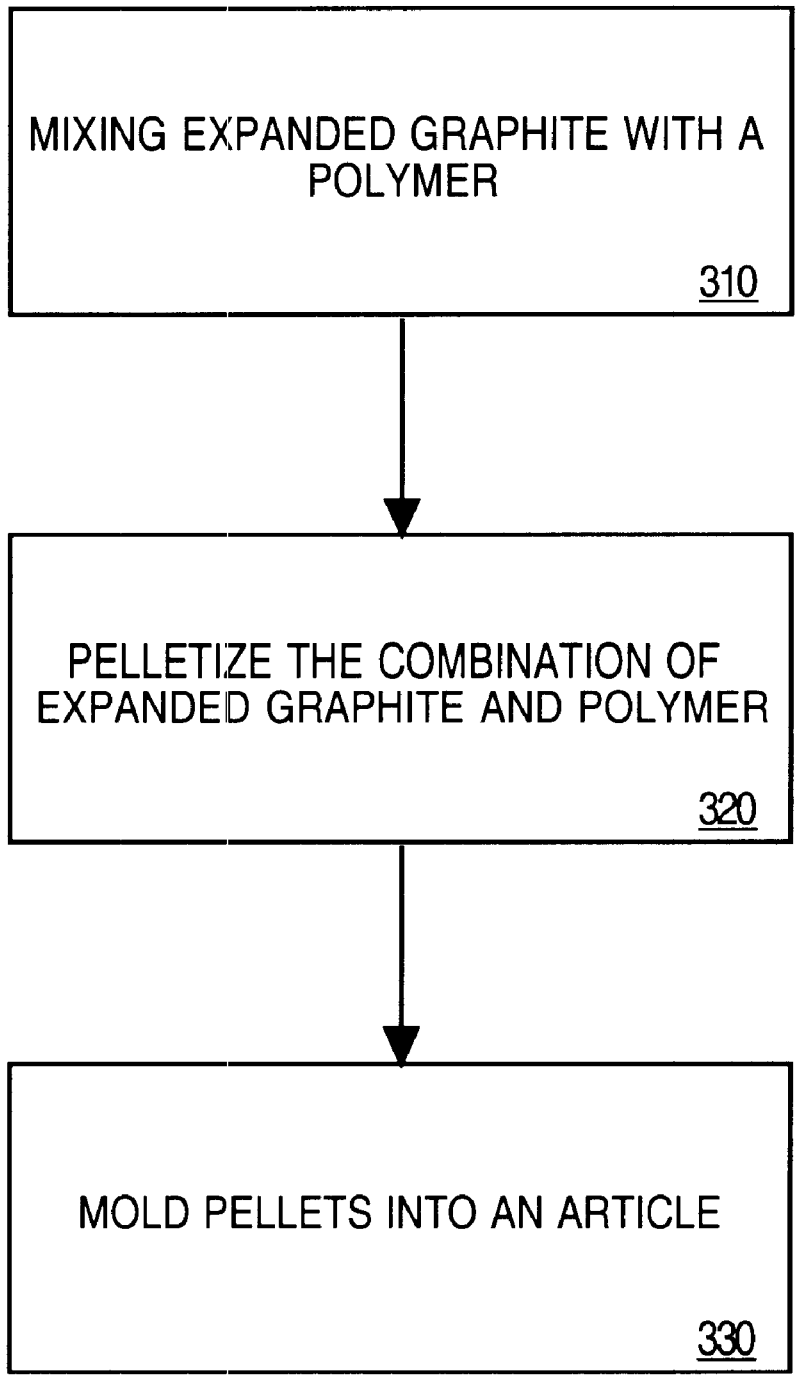
FIG. 3 is a flow chart showing a method of combining expanded graphite with a polymer and pelletizing the combination.

Referring to FIG. 3, in one embodiment, the expanded graphite is introduced to a moldable polymer and combined to make a moldable, polymer material. Suitable amounts of expanded graphite in a polymer will vary. In some instances the expanded graphite comprises one to 99 percent expanded graphite and more particular one to 20 percent. Suitable polymers include thermoplastic and thermoset polymers. In this regard, the polymer material comprises expanded graphite material and polymer as a polymerized product, a combination or a mixture. Referring to block 310, the introduction takes place, for example, in a heated mixing chamber that has a screw impeller to force the two materials into contact with each other while heating them to allow mixing of the expanded graphite and the moldable polymer into a moldable polymer material. In this example, the moldable polymer material is then pushed through an extruder, that pelletizes the material, as shown in block 320, by the screw impeller. The expanded graphite and the polymer can be combined by mixing together in a tubular mixer and heating the mixer while a large screw impeller, such as a KMD 90-26 extruder commercially available from Mannesmann-Demag-Krauss-Maffei of Munich, Germany, mixes the combination and extrudes the combined material through a pelletizer.

Suitable polymers for the operation described, with reference to FIG. 3 include, but are not limited to, thermoplastic resins. The thermoplastics include but are not limited to polyphenylene sulfide (PPS), nylon (e.g. nylon66), polycarbonate (PC), polyphenylene oxide (PPO), acrylonitrile butadiene styrene (ABS), polypropylene (PP), high density polyethylene (HDPE) and thermoplastic olefin (TPO). Suitable polymers also include the thermoset type, such as phenolic resin (e.g., resol-type or Novolac-type resin).

Prior to pelletizing to combine expanded graphite with polymer in FIG. 3, expanded graphite, or a mixture of expanded graphite and polymer, can be combined with a filler. Suitable fillers include, but are not limited to at least one of the following: carbon black, carbon fibers, talc, re-expanded graphite, recycled expanded graphite, glass, carbon nanotubes, clay, synthetic graphite, stainless steel fibers and aluminum or copper flake. The carbon fibers used as a filler with expanded graphite include but are not limited to polyacrylnitrile (PAN) fibers, pitch carbon fibers and rayon-based carbon fibers.

The pellets referred to in block 320 of FIG. 3 are suitable, in one regard, for making conductive polymer articles.

Expanded graphite can be combined with polymers in more than one stage. Expanded graphite can be combined with a polymer and/or filler, as mentioned above. The pellets or premix, in one embodiment, can be 30 percent expanded graphite and 70 percent polymer. Premixing the graphite in a polymer, filler mix reduces the dust generated by handling graphite. For example, a manufacturer of polymer pellets (e.g., a compactor) or a manufacturer of polymer components may desire to receive a graphite material from a graphite supplier in a form that is generally free of graphite dust, such as a premix of polymer and graphite. Additional polymer or filler can be combined with the pelletized expanded graphite polymer/filler mix from the earlier mixing. The pellets derived from this second mixing, in one embodiment can be approximately one to 20 percent (e.g., 10 percent) expanded graphite, and ready for molding.

One method for turning conductive pellets into articles is by molding. The basic methods of molding a polymer into an object are injection molding, blow molding and compression molding. Injection molding is typically used for forming thermoplastic polymers into solid objects. Blow molding is typically used to form hollow objects out of thermoplastic materials. Compression molding is typically used to form solid objects out of thermoset polymers. Other suitable molding techniques include, but are not limited to, injection compression molding, roto-molding and sheet molding.

Injection molding begins by placing a polymer material (e.g., comprising a thermoplastic polymer and expanded graphite) in a chamber that can be heated and compressed. As the polymer material is heated until it softens and turns liquid, the chamber is compressed so the polymer material is forced to enter a mold held adjacent to the chamber. Compression is applied to the heated chamber until the liquid polymer material fills the mold. When the polymer material cools, the mold is opened and the solid polymer material object is removed from the mold.

Blow molding begins with a molten tube of polymer material, derived for example from the polymer material pellets described above, that is placed in a mold. Compressed air is introduced into the tube of polymer material, causing the tube to expand until it fills the confines of a blow mold. When the polymer material cools, the blow mold is opened and the hollow polymer material object is removed.

Compression molding begins with an open mold and an amount of polymer material, derived for example from the polymer material pellets described above, placed in the mold. The mold is closed confining the polymer material within the mold. The mold compresses the polymer material forcing it to fill the contours of the mold. While the mold is closed, it is heated causing the polymer material to undergo a chemical change that permanently hardens the polymer material into the shape of the mold. When the polymer material cools, the mold is opened and the polymer material object is removed.

Alternative molding techniques include extruding the polymer material into the desired object. Examples of this technique include, but are not limited to, pipes and plates.

In the preceding detailed description, specific embodiments are described. It will, however, be evident that various modifications and changes may be made thereto without departing from the broader spirit and scope of the claims. The specification and drawings are, accordingly, to be regarded in an illustrative rather than a restrictive sense.

What is claimed is:

1. A method of making expanded graphite material comprising:

grinding flexible graphite into a powder having a particle size in the range of 25 to 80 mesh, soaking the graphite powder in a solution consisting essentially of water, and heating the soaked graphite powder to a temperature sufficient to cause thermal shock expansion thereof.

2. The method of claim 1 wherein the flexible graphite is recycled graphite foil.

3. The method of claim 1 wherein the solution further comprises a surfactant.

4. The method of claim 1 wherein the heating in the thermal shock occurs at a temperature of approximately 800° C. to 1100° C. for a period of about 1 hour, under pressure.

5. A method of making expanded graphite material comprising:

grinding flexible graphite into a powder having a particle size in the range of 25 to 80 mesh, soaking the graphite powder in a solution consisting essentially of water, heating the soaked graphite powder to a temperature sufficient to cause thermal shock expansion thereof; and mixing the expanded graphite with a polymer.

6. The method of claim 5 wherein the graphite is recycled graphite foil.

7. The method of claim 5 wherein the solution further comprises a surfactant.

8. The method of claim 5 wherein the heating in the thermal shock occurs at a temperature of approximately 800° C. to 1100° C. for a period of about 1 hour, under pressure.

9. The method of claim 5 wherein the polymer is one of a thermoset polymer and a thermoplastic polymer.

10. The method of claim 5, further comprising, after mixing, pelletizing the combination.

11. An article comprising:

graphite particles formed by a thermal shock expansion graphite soaked in a solution consisting essentially of water.

12. The article of claim 11, further comprising a polymer.

13. The article of claim 12, wherein the weight percent of the polymer is 80 to 99 percent.

* * * * *